Patented Apr. 14, 1931

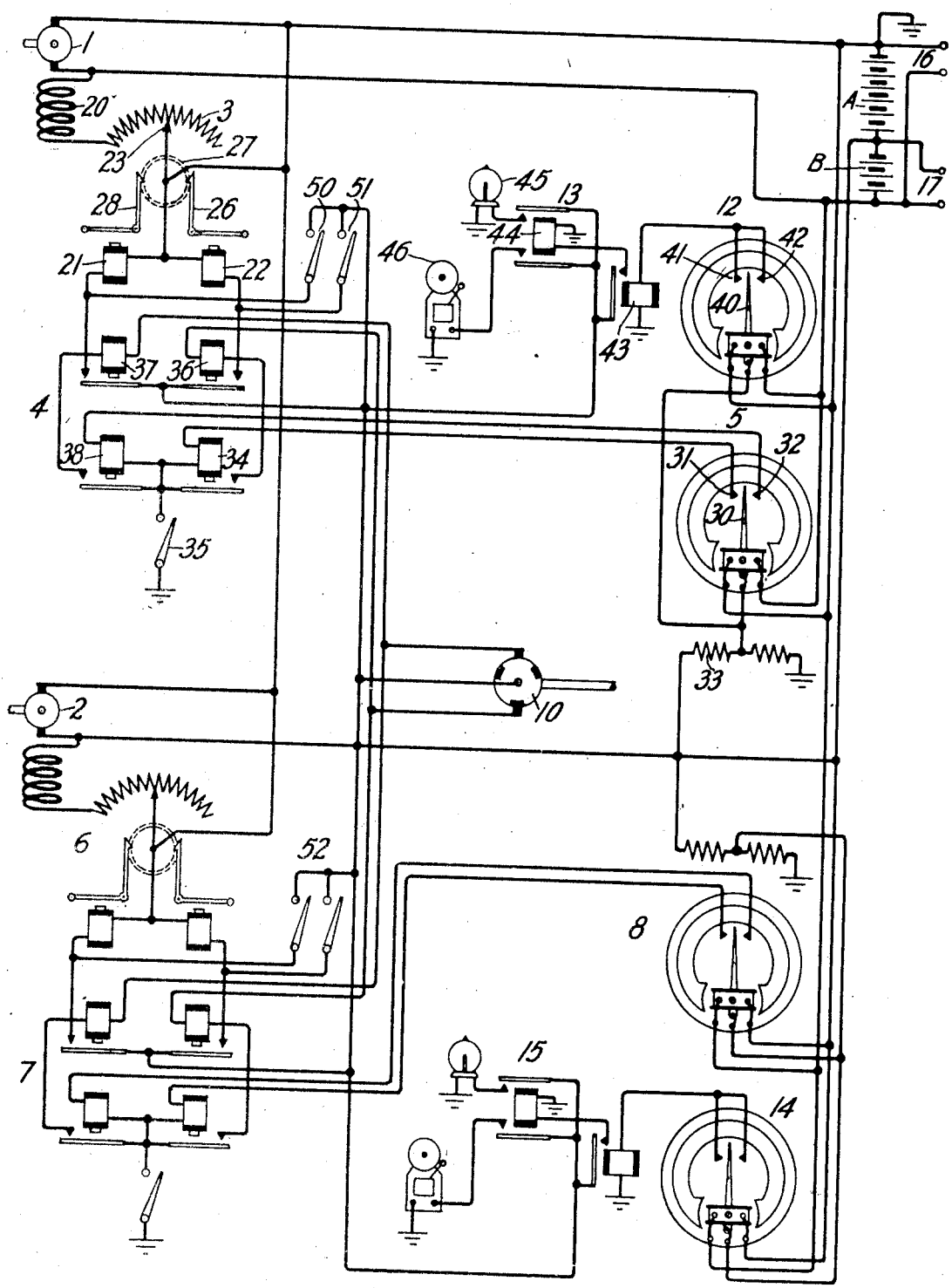

1,800,394

UNITED STATES PATENT OFFICE

ROBERT L. LUNSFORD, OF BELLEVILLE, NEW JERSEY, ASSIGNOR TO BELL TELEPHONE LABORATORIES, INCORPORATED, OF NEW YORK, N. Y., A CORPORATION OF NEW YORK

REGULATING DEVICE

Application filed January 31, 1927. Serial No. 164,707.

This invention relates to regulating devices, and more particularly to voltage regulators for storage batteries.

In accordance with this invention a battery charging system is provided in which a rheostat is connected to the field winding of a charging generator and in which means responsive to the potential of the battery to be charged is provided to impart to said rheostat a number of separate successive movements to vary the resistance connected to said field winding for the purpose of maintaining said battery at a substantially constant voltage.

Another feature of the invention is an arrangement in which a common interrupting device is employed for controlling the rheostats of a plurality of battery charging systems in their separate successive movements.

Voltage regulating systems arranged in accordance with this invention may consist of a storage battery, a generator for charging it, a rheostat in series with the field winding of the generator, and means including a voltage operated relay in the output circuit of the storage battery for regulating the rheostat. This voltage operated relay is adjusted to respond when the voltage of the battery reaches a certain maximum or a certain minimum to actuate the rheostat, through suitable electromagnetic devices, to increase or decrease the exciting current of the generator to restore the voltage of the battery within these limits. Another voltage operated relay may be inserted in the output circuit of the battery. This relay may be adjusted to actuate an alarm device when for some reason or other the system fails to perform its normal functions; that is, the relay responds when the voltage of the battery exceeds or falls short of the above mentioned limits.

The invention has been illustrated in the accompanying drawing as applied to systems for charging two telephone batteries of different voltages from two different generators having rheostats controllable from voltage operated relays and electromagnetic devices in circuits therewith.

Referring now to the drawing, the battery consisting of the portions A and B is arranged to be charged by generator 1 and the battery consisting of the portion A only is arranged to be charged by the generator 2. Generator 1 is adapted to be automatically controlled to change its output energy for the charging of battery portions A and B, by means of rheostat 3, relay arrangement 4 and voltmeter relay 5, while the generator 2 is adapted to be similarly controlled by the rheostat 6, relay arrangement 7 and the voltmeter relay 8. The generators 1 and 2 may be connected for rotation to motors or any other suitable driving means. The voltmeter relays may be of any well known construction having coils located between the poles of a permanent magnet and equipped with a contact arm as shown. The interrupter 10 is common to the two charging and control systems and cooperates therewith to control the movements of the step-by-step rheostats and to prevent hunting by the generators, as will be hereinafter more fully described. This interrupter may be driven by any suitable source of power. Voltmeter relay 12 is associated with the voltmeter relay 5 and batteries A and B for the purpose of actuating an alarm circuit 13, when for some reason or other the charging and control system for batteries A and B fails and voltmeter relay 14 and the alarm circuit 15 are provided for giving an alarm when the charging and control system for battery B fails. The terminals 16 are provided for the connection of the batteries A and B to a load circuit and the terminals 17 are provided for the connection of battery B to a similar load circuit. These load circuits may be used for providing battery sources of different voltages in telephone systems.

To make clear the operation of this system, a description will be made of the charging and control arrangement for the battery portions A and B. This will be sufficient as the arrangement and function of the system for charging and controlling battery A is identical.

It will be observed that rheostat 3 is inserted in series with the field winding 20 of generator 1 and that magnets 21 and 22 may, through suitable mechanisms, cause the contact arm 23 to be moved in one direction or the other over the rheostat 3, so as to change the resistance through the field winding 20 and thus cause the energy output of the generator to be varied accordingly, in a manner well known in the art. The mechanism for actuating the contact arm 23 under control of magnets 21 and 22 may be of any well known type and has, therefore, been shown in the drawing merely in a diagrammatic form. This actuating means has been indicated by pawl mechanisms 26 and 28 and ratchet wheels, indicated by a dotted circle 27, that may be connected directly to arm 23 and actuated each by a corresponding pawl mechanism.

The generator 1 charges the battery portions A and B to maintain a uniform charge thereon, so that under normal conditions of the load at terminals 16, these batteries may ordinarily be floating across the terminals, that is, the generator output will be equal to the load and the batteries will be maintained fully charged. However, if the load should vary, as it generally does in telephone circuits at different periods during the day, the voltmeter relay 5 is so adjusted as to operate its contact 30 to connect with contact 31 when the voltage of the batteries A and B has reached a certain maximum above the normal value, which would be the case when the load decreases below normal, and so adjusted that the contact arm 30 will connect with contact 32 when the voltage of the battery has decreased to a certain minimum below the normal value, which would be the case when the load increases above normal.

When, therefore, the voltage of batteries A and B increases above said maximum value when the load decreases, the connection closed between contact arm 30 and contact 31 causes a circuit to be closed as follows: from battery A, resistance 33, contact arm 30 and contact 31, relay 34, switch 35 to ground. Switch 35 is normally closed, but will disable the system when it is opened. The resistance 33 is such as to decrease the current from battery A so as not to injure the sensitive relay 34 and contacts 30 and 31 of voltmeter relay 5. The operation of relay 34 completes a circuit for the operation of relay 36 as follows: from battery A, interrupter 10, winding of relay 36, armature and front contact of relay 34 to ground through switch 35. As the interrupter 10 is constantly rotating to alternately close and open this circuit, relay 36 will be alternately operated and released by this circuit. The operation of relay 36 closes a circuit for magnet 22 as follows: from battery A, armature and front contact of relay 36, winding of magnet 22 to ground at battery A. The alternate operation and release of relay 36 will thus cause the alternate operation and release of magnet 22 and this magnet in turn will, therefore, actuate the ratchet mechanism 27 through the pawl 26 to move arm 23 in a step-by-step manner in a clockwise direction over rheostat 3.

This movement of arm 23 will increase the resistance through the field winding 20 and thus decrease the output energy of the generator 1 and consequently cause the batteries A and B to be charged at a lower rate to compensate for the decrease in the load at the terminals 16 and to gradually decrease the voltage of the batteries below the maximum limit. When this limit is reached, voltmeter relay 5 will respond and open the connection between contacts 30 and 31. This will release relay 34 and open the circuit for relay 36 and this relay in turn will open the circuit for magnet 22. The contact arm 23 will now remain in the position to which it has been set, if the rate at which the battery is charged by the generator at this time is sufficient to maintain it floating across the terminals 16. This would be the case if the load at the terminal remains constant or equal to the energy output of the generator after the battery has reached its normal value.

On the other hand, if the load does not remain the same but increases, the voltage of the batteries A and B will gradually decrease until its above mentioned minimum value has been reached and if this is the case, voltmeter relay 5 will again operate at this time to close the connection between contacts 30 and 32. This connection will close an obvious circuit for the operation of relay 38. Relay 38 in operating closes an obvious circuit for relay 37 through the interrupter 10 and the interrupter will in this case alternately operate and release relay 37. Relay 37 in operating closes a circuit for magnet 21, which will also be alternately operated and released to actuate the pawl mechanism 28 and through the ratchet mechanism 27 to move contact arm 23 in a step-by-step manner in a counterclockwise direction over the rheostat 3. This movement of arm 23 will cause a decrease in resistance through the field winding 20 and thus cause the energy output of generator 1 to increase and consequently increase the rate at which batteries A and B will now be charged. If the load at the terminals 16 does not increase further the batteries A and B will soon again be floating across these terminals. That is, the voltage will increase above the minimum limit and cause voltmeter relay 5 to be released to open the connection between contacts 30 and 32 and thus release relays 38 and 37 and prevent magnet 21 from further operating the arm 23.

In this manner, the batteries A and B, regardless of the load will be floated and the generators will take care of the varying loads. This will maintain the battery voltage practically constant or at least maintain it floating between the maximum and minimum limits at which the voltmeter relay 5 will operate to cause an increase or decrease of the rate at which the batteries A and B will be charged at any one time.

The purpose, as stated, of the interrupter 10 is to cause the arm 23 to be moved over the rheostat 3 in a step-by-step manner. The interrupter may also be so adjusted that these steps occur at such intervals and are of such character with regard to the distance between the steps that sufficient time is allowed for the generator to adjust itself between the steps to deliver the proper output of energy as controlled by the arm 23. This energy will then cause the operation and release of the voltmeter relay 5 in time to prevent the arm 23 from increasing or decreasing the output of generator 1 beyond the desired value. In other words, the generator 1 is prevented from "hunting" or unnecessarily increasing or decreasing its energy output.

If the load at the terminals 16 is suddenly increased or decreased so that the generator 1 will not have sufficient time to return the battery voltage within the desired limit, as outlined above, within a reasonable time, an alarm will be given to indicate this condition. That is, if the batteries A and B become drained beyond the above mentioned minimum limit or become charged above the maximum limit this alarm will be given.

Voltmeter relay 12 is provided for this purpose and will operate its contact arm 40 to make a connection with the contact 41 when the voltage of the battery has increased, or with contact 42 when the voltage has decreased a fixed amount above or below the maximum and minimum limits set for the operation of voltmeter relay 5. For example, voltmeter relay 12 may operate to cause arm 40 to close a connection with contact 41 when the voltage of batteries A and B has increased one volt above the maximum voltage limit at which voltmeter relay 5 operates in one direction, or to close a connection between contact 40 and 42, when the voltage of batteries A and B has decreased one volt below the minimum voltage limit at which voltmeter relay 5 operates in the opposite direction. In either case, a connection will be closed for relay 43 over a circuit as follows: battery A, resistance 33, arm 40, contact 41 or 42, winding of relay 43 to ground. The operation of relay 43 closes an obvious circuit from battery A for the operation of relay 44, which in turn closes an obvious circuit for the lighting of lamp 45 and for the operation of the alarm device 46 to indicate that the system is not functioning properly.

It is also evident that the voltmeter relay 12 will operate when the voltmeter relay 5, the relay arrangement 4, the rheostat 3 or generator 1 fail to operate for some defect in these various devices, as in this case an overcharge of batteries A and B or a decrease in its normal charge will cause the operation of voltmeter relay 12 to give the proper alarm.

Switches 50 and 51 are provided for manually closing circuits for the operation of magnets 21 or 22 respectively to cause changes in the exciting current of the generator 1 when it is desired to maintain batteries A and B charged independently of the automatic charging and control equipments.

The description of the invention of the system as given above for controlling the charge on batteries A and B applies equally well to the means for controlling the charge on battery B. This means consisting, as hereinbefore mentioned, of voltmeter relay 8, the relay mechanism 7, the rheostat 6 and the generator 2. The alarm means in this case will function under similar circumstances to the alarm means 12 and 13. This means for battery B consists, as stated hereinbefore, of voltmeter relay 14 and the alarm circuit means 15. Switches 52 are used for manual operation of the system.

It is evident that the invention is not limited to the particular system shown in the drawings but that it may take many different forms without departing from the spirit thereof.

What is claimed is:

1. In a battery charging device, two batteries to be charged and a generator for charging each of said batteries, a rheostat for each generator in series with the winding thereof, an electromagnetic device for actuating each rheostat to increase or decrease the resistance thereof in connection with the associated field winding, a voltmeter relay connected to each battery, means controlled by each voltmeter relay for actuating the associated electromagnetic device to cause an increase in the charging current from the associated generator when the voltage of the associated battery has decreased to a certain minimum and to cause a decrease in the charging current when the voltage of the associated battery has increased to a certain maximum, and an interrupter common to said last mentioned means for interrupting at frequent intervals the control thereof to prevent hunting actions of the associated generators.

2. In a charging system, two batteries to be charged, a charging generator for each battery, a rheostat connected to the field winding of each of said generators, a driving means for each of said rheostats comprising a step-by-step mechanism and two pulsing magnets, one for driving the step-by-step mechanism in one direction to decrease the effective resistance of the associated rheostat in connection with the generator winding and the other for driving the step-by-step mechanism in the opposite direction to increase the effective resistance of said rheostat in connection with said winding, a circuit for each of said magnets, a control relay for each of said circuits, a circuit for each relay, an interrupter common to all of said relay circuits for opening and closing said relay circuits at one point, a relay for each of said last mentioned relay circuits for closing said circuits at another point, a circuit for each of said four last mentioned relays, and a voltmeter relay associated with each battery, each voltmeter relay adapted to control the circuits of one or the other of two of said last mentioned four relays depending on whether the voltage of the associated battery is below or above a certain limit.

3. In a battery charging device, a plurality of batteries to be charged and a generator for charging each battery, a rheostat for each generator in series with the field winding thereof, an electro-magnetic device for actuating each rheostat to increase or decrease the resistance thereof in connection with the associated field winding, a voltage responsive device connected to each battery, means controlled by each voltage responsive device for actuating the associated electromagnetic device to cause an increase in the charging current from the associated generator when the voltage of the associated battery has decreased to a certain minimum and to cause a decrease in the charging current when the voltage of the associated battery has increased to a certain maximum and an interrupting device common to said last mentioned means for interrupting at frequent intervals the control thereof over the electromagnetic devices to prevent hunting action of the associated generators.

In witness whereof, I hereunto subscribe my name this 28th day of January A. D., 1927.

ROBERT L. LUNSFORD.